(12) United States Patent
Pang

(10) Patent No.: US 8,453,933 B1
(45) Date of Patent: Jun. 4, 2013

(54) APPARATUS FOR AND METHOD OF DISTINGUISHING AMONG SUCCESSIVE PRODUCTS ENTERING A POINT-OF-TRANSACTION WORKSTATION BY DETECTING THEIR EXIT THEREFROM

(75) Inventor: Robert Pang, Williston Park, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/315,626

(22) Filed: Dec. 9, 2011

(51) Int. Cl.
*G06K 7/10* (2006.01)
(52) U.S. Cl.
USPC .................................. 235/462.32; 234/462.25
(58) Field of Classification Search
USPC ............................ 235/462.32, 470; 250/214.1
See application file for complete search history.

(56) References Cited

U.S. PATENT DOCUMENTS

| | | | |
|---|---|---|---|
| 6,222,178 B1 * | 4/2001 | Kawai et al. | 250/214.1 |
| 8,033,472 B2 | 10/2011 | Giebel et al. | |
| 2007/0152061 A1 * | 7/2007 | Blanford | 235/462.32 |

* cited by examiner

*Primary Examiner* — Daniel Hess
(74) *Attorney, Agent, or Firm* — Nong-Qiang Fan

(57) ABSTRACT

Successive products associated with targets to be electro-optically read are swiped or presented, in their respective turns, to a window in a point-of-transaction workstation. A proximity system detects entry of each product into a zone outside the window. The products are distinguished from one another in response to detection by the proximity system of the exit of each product from the zone, preferably by sensing a change in magnitude over time of return infrared light returned by each product.

11 Claims, 4 Drawing Sheets

APPARATUS FOR AND METHOD OF DISTINGUISHING AMONG SUCCESSIVE PRODUCTS ENTERING A POINT-OF-TRANSACTION WORKSTATION BY DETECTING THEIR EXIT THEREFROM

FIELD OF THE DISCLOSURE

The present disclosure relates generally to an apparatus for, and a method of, distinguishing among successive products entering a point-of-transaction workstation and bearing, or associated with, targets to be electro-optically read, by detecting the exit of each product from the workstation and, more particularly, to preventing accidental double-reading of the same target and to accelerating intentional reading of successive identical targets.

BACKGROUND

Point-of-transaction workstations employing laser-based readers and/or imager-based readers have been used in many venues, such as supermarkets, department stores and other kinds of retail settings, as well as libraries and parcel deliveries and other kinds of public settings, as well as factories, warehouses and other kinds of industrial settings, for many years. Such workstations were often configured either as stand-mounted scanners each resting on a countertop and having a presentation window; or as vertical slot scanners each resting on, or built into, the countertop and having a generally vertically arranged, upright presentation window; or as flat-bed or horizontal slot scanners each resting on, or built into, the countertop and having a generally horizontally arranged presentation window; or as bi-optical, dual window scanners each resting on, or built into, the countertop and having both a generally horizontal presentation window supported by a generally horizontal platform and a generally vertically arranged, upright presentation window supported by a generally upright tower. Such workstations were often operated to electro-optically read a plurality of symbol targets, such as one-dimensional symbols, particularly Universal Product Code (UPC) bar code symbols, truncated symbols, stacked symbols, and two-dimensional symbols, as well as non-symbol targets, such as driver's licenses, receipts, signatures, etc., the targets being associated with, or borne by, objects or products to be processed by, e.g., purchased at, the workstations.

A user, such as an operator or a customer, slid or swiped a product associated with, or bearing, the target in a moving direction across and past a respective presentation window in a swipe mode, or momentarily presented, and steadily momentarily held, the target associated with, or borne by, the product to an approximate central region of the respective presentation window in a presentation mode. The products could be moved relative to the respective window in various directions, for example, from right-to-left, or left-to-right, and/or in-and-out, or out-and-in, and/or high-to-low, or low-to-high, or any combination of such directions, or could be positioned either in contact with, or held at a working distance away from, either window during such movement or presentation. The choice depended on the type of the workstation, or on the user's preference, or on the layout of the venue, or on the type of the product and target. Return light returning from the target in the laser-based reader and/or in the imager-based reader was detected to generate an electrical signal indicative of the target. The electrical signal was then processed, and, when the target was a symbol, was decoded, and read, thereby identifying the product.

Early all imager-based, bi-optical workstations required about ten to twelve, or at least six, solid-state imagers having multiple, intersecting fields of view extending through the windows in order to provide a full coverage scan volume in front of the windows to enable reliable reading of the target that could be positioned anywhere on all six sides of a three-dimensional product. To bring the cost of the imager-based workstation down to an acceptable level, it was known to reduce the need for the aforementioned six to twelve imagers down to two imagers, or even one imager, by splitting the field of view of at least one of the imagers into a plurality of subfields of view, each additional subfield serving to replace an additional imager. These subfields also intersected each other in order to again provide a full coverage scan volume that extended above the horizontal window and in front of the upright window as close as possible to a countertop, and sufficiently high above the countertop, and as wide as possible across the width of the countertop. The scan volume projected into space away from the windows and grew in size rapidly in order to cover targets on products that were positioned not only on the windows, but also at working distances therefrom.

Each imager included a one- or two-dimensional, solid-state, charge coupled device (CCD) array, or a complementary metal oxide semiconductor (CMOS) array, of image sensors (also known as pixels), and typically had an associated illuminator or illumination system to illuminate the target with illumination light over an illumination field. Each imager also had an imaging lens assembly for capturing return illumination light reflected and/or scattered from the target, and for projecting the captured return light onto the sensor array. Each imager preferably operated at a frame rate of multiple frames per second, e.g., sixty frames per second. Each field of view, or each subfield, was preferably individually illuminated, and overlapped, by a respective illumination field and extended through the windows over regions of the product. Each imager included either a global or a rolling shutter to help prevent image blur, especially when the targets passed through the scan volume at high speed, e.g., on the order of 100 inches per second.

Preferably, to reduce power consumption, to prolong operational lifetime, and to reduce bright light annoyance to operators and customers, the illumination light was not emitted at all times, but was emitted in response to detection of return infrared (IR) light by an IR-based proximity system that included an IR emitter operative for emitting IR light into an IR emission field, and an IR sensor for sensing the return IR light within an IR detection field. A product entering the IR emission field reflected and/or scattered at least a portion of the emitted IR light incident on the product to the IR sensor. Detection of this return IR light by the IR sensor determined that the product had indeed entered the workstation, thereby triggering the illumination system and the reading of the target.

Although generally satisfactory for their intended purpose, one issue with such known presentation-type workstations involved accidental double-reading of a target, i.e., where a single target was read and reported to a host more than once. If a product with a target was kept in the workstation even after the target was initially read, or if the product was removed too slowly from the workstation, or if the product was moved to different locations in the workstation, a single target might be read and reported several times and, thus, the number of product transactions which were intended to be reported would not correspond to the number of product transactions which were actually reported.

Accidental double-reading was not an issue for handheld scanners that employed a trigger to distinguish among targets. However, the above-described known presentation-type workstations, which were free-running, i.e., triggerless, typically relied on a predetermined timeout period, such as one or two seconds in duration, to prevent accidental double-reads of the same target from being reported to the host. Thus, if a second read, that was identical to a first read, occurred before the timeout period elapsed, then the second read was discarded or not reported, because it was assumed that an accidental double-read had occurred. However, if the second read occurred after the timeout period elapsed, then the second read was reported, because it was assumed that the second read was intentional.

Nevertheless, there were circumstances where it was desired to intentionally read successive identical targets. For example, sometimes multiple identical products from the same supplier, e.g., multiple cans of the same soda brand, were successively swiped or presented at the workstation. Although the known workstations were effective in preventing accidental double-reads by relying on the above-described timeout period, this reliance slowed down any such intentional reading of successive identical targets, because the user had to wait for the timeout period to elapse before the next product could be swiped or presented. As a consequence, the overall throughput of the workstation was decreased, and the performance of the workstation was sometimes regarded as sluggish and, in some cases, was regarded as a defect.

Accordingly, it would be desirable to reliably prevent accidental double-reading of the same target, and to accelerate the intentional reading of successive identical targets without experiencing and being delayed by any fixed timeout period, and to increase the overall throughput of the point-of-transaction workstation.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
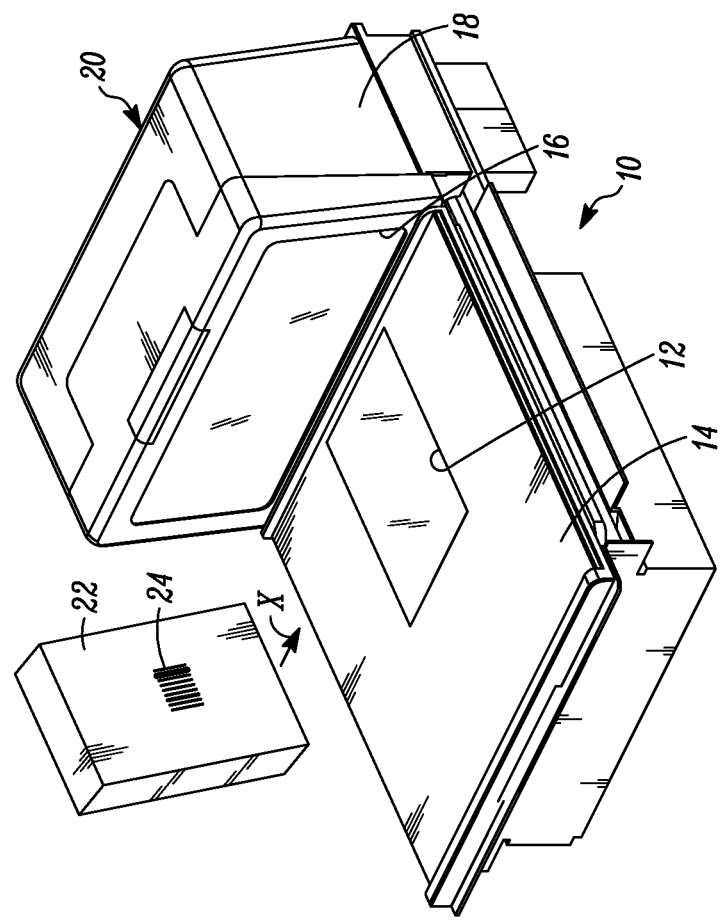
FIG. 1 is a perspective view of a dual window, bi-optical, point-of-transaction workstation for imaging and reading successive targets on successive products passing through the workstation.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus or workstation, in accordance with one feature of this invention, is operative for processing successive products associated with successive targets to be electro-optically read. The apparatus includes a housing, a window supported by the housing, and a reading system supported by the housing and operative for reading the successive targets with return light from the targets passing through the window. The apparatus also includes a proximity system supported by the housing and operative for detecting entry of each successive product associated with a respective successive target into a zone outside the window, and for detecting exit of each successive product associated with the respective successive target from the zone. A controller is operatively connected to the reading system and the proximity system. The controller processes the return light from the respective successive target in response to detection of the entry of each successive product into the zone, and distinguishes among the successive products in response to detection of the exit of each successive product from the zone.

Different reading systems are contemplated. Preferably, the reading system includes a solid-state imager having an array of image sensors looking at a field of view that extends through the window to each target to be imaged, and an energizable illumination system for illuminating the field of view with illumination light over an illumination field. The controller is operative for energizing the illumination system in response to the detection of the entry of each successive product into the zone, and for processing return illumination light returned from the respective successive target and captured in the field of view by the imager. Laser-based reading systems could also be employed.

Different housing configurations are contemplated. When configured as a vertical slot scanner, for example, the housing supports the window as a single upright window in an upright plane. When configured as a flat-bed or horizontal scanner, for example, the housing supports the window as a single generally horizontal window in a generally horizontal plane. When preferably configured as a bi-optical scanner, the housing has an upright tower that supports the window in an upright plane, and also has a generally horizontal platform that supports an additional window in a generally horizontal plane that intersects the upright plane.

Different proximity systems are contemplated. Preferably, the proximity system is light-based and includes an infrared (IR) emitter for emitting IR light into an IR emission field, and an IR sensor for sensing return IR light within an IR detection field that, preferably, but not necessarily, intersects the IR emission field in the zone. The IR sensor is operative for detecting the entry of each successive product into the zone, and for detecting the exit of each successive product from the zone by sensing a change in magnitude over time of the return IR light returned by each successive product. The controller determines whether each change in magnitude over time of the return IR light is indicative of a swipe mode, as described above, in which a product is swiped across the window, or a presentation mode, as also described above, in which a product is presented and momentarily held at the window. An analog output signal of the IR sensor has a slope that is indicative of this change in magnitude over time of the return IR light. The controller determines whether each change in magnitude over time, i.e., the slope, of the return IR light of the product exiting the zone exceeds a predetermined threshold or slope for each mode.

By distinguishing among the successive products, accidental double-reading of the same target is reliably prevented, and the intentional reading of successive identical targets without experiencing and being delayed by any fixed timeout period is accelerated. The overall throughput of the point-of-transaction workstation is thus improved.

Turning now to the drawings, reference numeral 10 in FIG. 1 generally identifies a dual window, bi-optical, point-of-transaction workstation typically used by retailers to process transactions involving the purchase of products 22 bearing, or associated with, identifying targets 24 or indicia, such as the UPC symbol described above. The workstation 10 includes a housing 20 having a generally horizontal, preferably rectangular, window 12 located in a generally horizontal plane and supported by a horizontal housing portion or platform 14 of different sizes, and a vertical or generally vertical (referred to as "vertical" or "upright" hereinafter) window 16 that is located in a generally upright plane that intersects the generally horizontal plane and that is supported by a raised housing portion or tower 18. The upright plane may lie in a vertical plane, or be slightly rearwardly or forwardly inclined relative to the vertical plane. The upright, preferably rectangular, window 16 is preferably recessed within its housing portion 18 to resist scratching. The products are passed by a user 26 (see FIGS. 3-4), i.e., an operator or a customer, through a scan volume, which occupies the space at and above the horizontal window 12, and also occupies the space at and in front of the upright window 16.

By way of numerical example, the generally horizontal window 12 measures about four inches in width by about six inches in length, while the generally upright window 16 measures about six inches in width by about eight inches in length. The platform 14 may be long, e.g., on the order of twelve inches as measured in a direction away from and perpendicular to the upright window 16, or short, e.g., on the order of eight inches as measured in a direction away from and perpendicular to the upright window 16.

The workstation 10 includes one or more cameras or solid-state imagers 30 (two shown schematically in FIG. 2), each having a sensor array, preferably a one- or two-dimensional, charge coupled device (CCD) array, or a complementary metal oxide semiconductor (CMOS) array, of image sensors (also known as pixels), preferably of megapixel size, e.g., 1280 pixels wide×960 pixels high, with an imaging field of view diagrammatically shown by arrows and looking out through the windows 12, 16. In a preferred embodiment, the imaging field of each imager 30 measures about 15 degrees by 30 degrees.

Each imager 30 includes, or is associated with, an illuminator or illumination system 32, mounted at the workstation, for illuminating the target 24 with illumination light over an illumination field that overlaps the respecting imaging field. Each illuminator 32 preferably includes one or more light sources, e.g., surface-mounted, light emitting diodes (LEDs), located at each imager 30 to uniformly illuminate the target 24. Each imager 30 includes an imaging lens system for capturing return illumination light reflected and/or scattered from the target 24, and for projecting the captured return light onto the respective sensor array.

Each imager 30 preferably has a shutter, typically a global shutter, that exposes each imager for an exposure time, preferably pre-set for the maximum anticipated exposure time needed to capture the target 24 at the maximum working distance away from each window. By way of example, the maximum exposure time can be set to a value between 400-750 microseconds. Each imager 30 preferably operates at a frame rate of sixty frames per second, each frame lasting about 16.67 milliseconds. The shutter insures that the captured images will not be disturbed by motion of the target 24 relative to the window(s) 12, 16 during the exposure time. A rolling or a mechanical shutter could also be employed. The target 24 and the product 22 can be presented or swiped at speeds up to around 100 inches per second across any part of either window.

In use, the user 26, such as an operator working at a supermarket checkout counter 28 (see FIGS. 3-4), processes a product 22 bearing a target 24 thereon, past the windows 12, 16 by swiping the product, e.g., in the direction of arrow X in FIG. 1, across a respective window in the abovementioned swipe mode, or by presenting and momentarily holding the product 22 at the respective window in the abovementioned presentation mode. The target 24 may located on any of the top, bottom, right, left, front and rear, sides of the product 22, and at least one, if not more, of the imagers 30 will capture the illumination light reflected, scattered, or otherwise returning from the target 24 through one or both windows. The imagers 30 are preferably looking through the windows at around 45° so that they can each see a side of the product 22 that is generally perpendicular to, as well as generally parallel to, a respective window.

Figure 2:
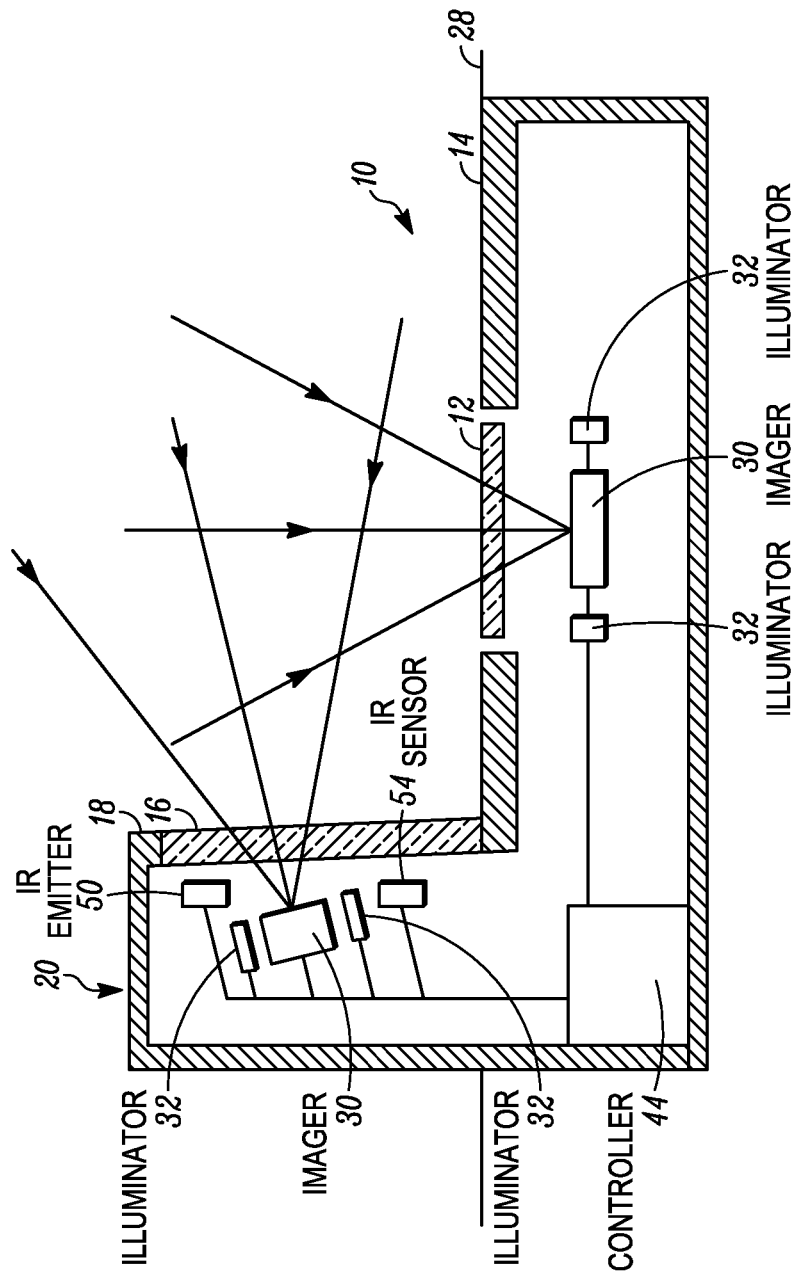
FIG. 2 is a part-sectional view of the workstation of FIG. 1 diagrammatically depicting certain component systems inside the workstation.

FIG. 2 also schematically depicts that the imagers 30 and their associated illuminators 32 are operatively connected to a programmed microprocessor or controller 44 operative for controlling the operation of these and other components. Preferably, the controller 44 is the same as the one used for processing the captured target images, and for decoding the return light scattered from the target when the target is a symbol.

In operation, the controller 44 sends successive command signals to the illuminators 32 in response to detection of a product 22 in a predetermined zone in the workstation, as described in detail below, to pulse the LEDs for a short time period of 100 microseconds or less, and successively energizes the imagers 30 to collect light from a target 24 only during said time period, also known as the exposure time period. By acquiring a target image during this brief time period, the image of the target is not excessively blurred even in the presence of relative motion between the imagers and the target.

Although the workstation 10 is illustrated in FIG. 2 as having two imagers 30, one for each window 12, 16, other configurations are within the scope of this invention. As disclosed, for example, in U.S. Pat. No. 8,033,472, the entire contents of which are incorporated herein by reference thereto, multiple imagers can be provided for each window, and an optical system comprised of multiple folding mirrors can be configured to establish multiple intersecting imaging fields of view looking out through each window. In addition, as noted above, the optical system may include optical splitters each operative for splitting the imaging field of view of at least one of the imagers into a plurality of imaging subfields of view, each additional imaging subfield serving to replace an additional imager. These imaging subfields also intersect and look out each window.

Each imaging field or subfield is illuminated in response to detection of the product 22 in the predetermined zone in the workstation by a proximity system. The controller 44 energizes the illumination system 32 in response to detection of the product 22 in the predetermined zone, and processes return illumination light returned from the target 24 and captured in the imaging field or subfield by the imager 30.

Figure 3:
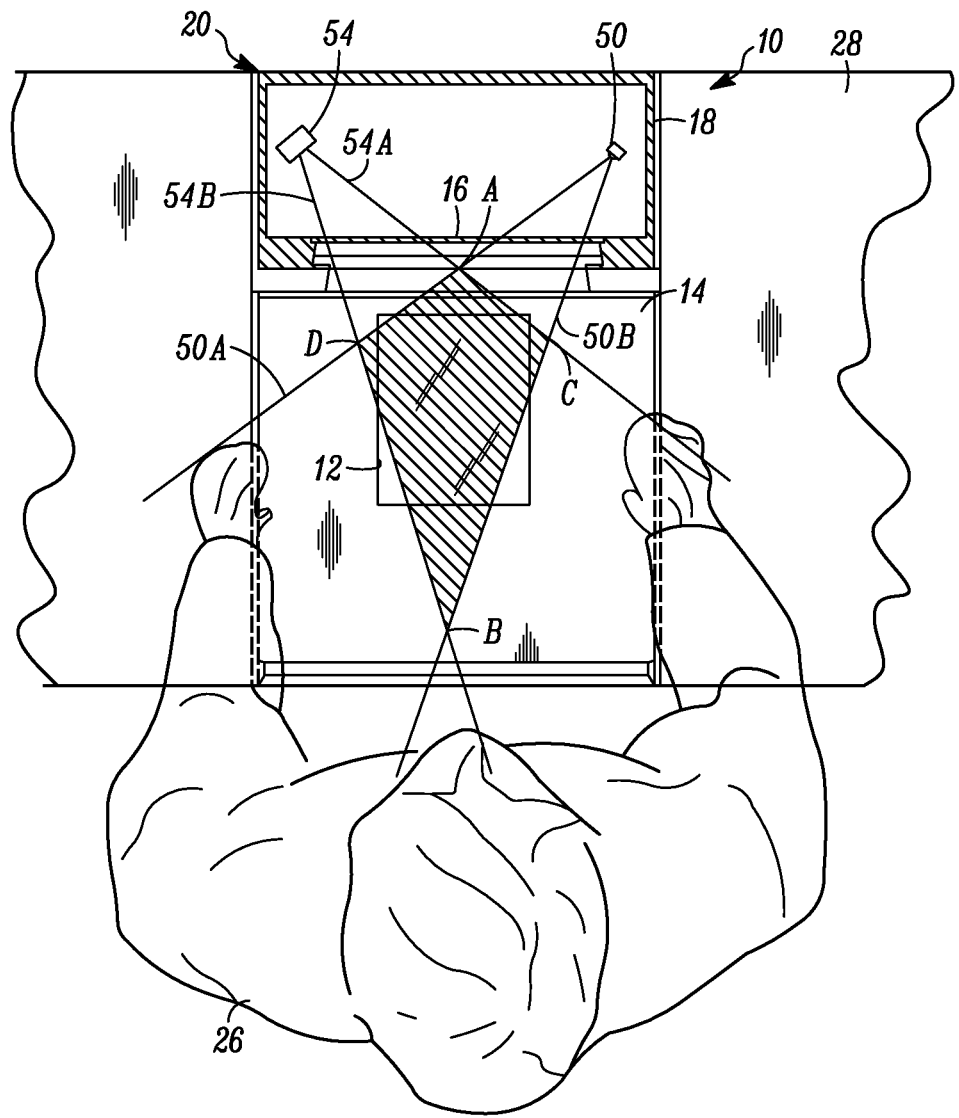
FIG. 3 is a part-sectional, overhead view of the workstation of FIG. 1 depicting a proximity system in accordance with this invention for detecting entry of the products into, and exit of the products from, the workstation.

A preferred embodiment of the proximity system is shown in FIG. 3, wherein the imagers 30 and the illuminators 32 have been removed for clarity. The proximity system is preferably light-based and includes an infrared (IR) emitter 50, preferably comprised of one or more light emitting diodes (LEDs), for emitting IR light into an IR emission field bounded by side boundary edges 50A, 50B, and an IR sensor 54 for sensing return IR light within an IR detection field bounded by side boundary edges 54A, 54B. The emitted IR light has its maximum intensity along an IR emission axis centrally located within the IR emission field. The return IR light has its maximum sensitivity along an IR detection axis centrally located within the IR detection field. The IR axes are preferably, but not necessarily, inclined and cross over and intersect one another directly in front of the upright window 16. The IR detection field intersects the IR emission field in a common area of intersection (shown by a quadrilateral area highlighted by hatched lines in FIG. 3 and having corners A, B, C, D) to define the aforementioned predetermined zone directly in front of the upright window 16. In the illustrated bi-optical configuration, the predetermined zone is also directly above, and is generally coextensive in area with, the generally horizontal window 12. The intersecting IR emission and detection fields above the horizontal window 12 and/or the platform 14 within the workstation 10, reduce false triggering by the proximity system, not only by the user 26 outside the workstation 10, but also by items or parts of the user 26 inside the workstation 10, but not in the predetermined zone A, B, C, D, e.g., directly overlying the generally horizontal window 12. As shown in FIG. 3, no part of the user is in the predetermined zone.

The IR sensor 54 is operative not only for detecting the entry of each successive product 22 into the zone, but also the exit of each successive product 22 from the zone. By detecting each such exit, successive products 22 are distinguished, and the above-described accidental double-reading of the same target 24 is reliably prevented. Also, the above-described intentional reading of successive identical targets 24 is accelerated without the prior art delay of any fixed timeout period, thereby improving the overall throughput of the point-of-transaction workstation 10.

Figure 4:
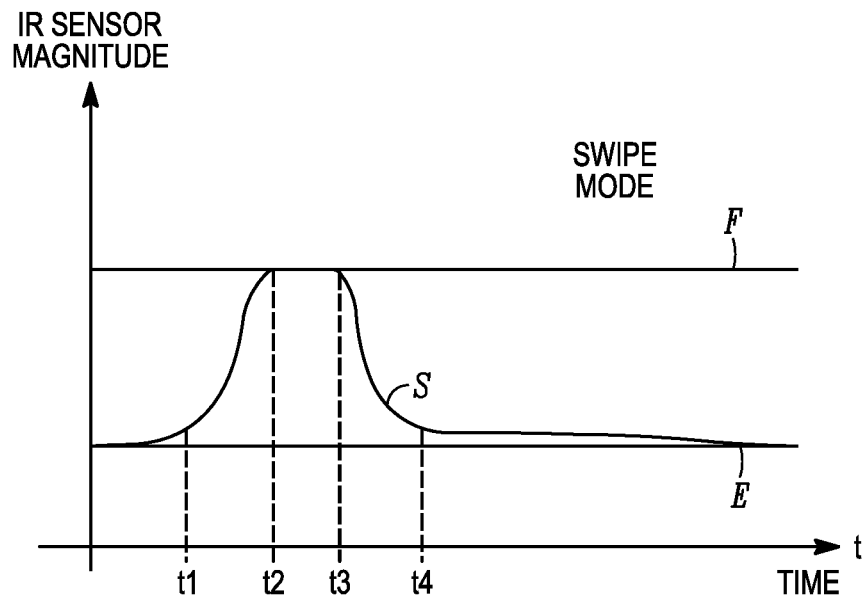
FIG. 4 is a graph of an analog signal waveform generated by the proximity system of FIG. 3 when a product is passed through the workstation in a swipe mode.

In the preferred embodiment, the IR sensor 54 senses a change in magnitude over time, i.e., the slope, of the return IR light returned by each successive product 22. This is best shown in FIG. 4, where the magnitude of the output analog signal produced by the IR sensor 54 as a function of time is depicted as waveform S for the swipe mode, and in FIG. 5, where the magnitude of the output analog signal produced by the IR sensor 54 as a function of time is depicted as waveform P for the presentation mode. For reference purposes, in each of FIGS. 4 and 5, waveform E depicts a constant, low magnitude, analog return signal output by the IR sensor 54 when no product 22 is present in the zone, and waveform F depicts a constant, high magnitude, output analog return signal output by the IR sensor 54 when the product 22 is constantly present in the zone.

In FIG. 4, the leading portion of the waveform S between times t1 and t2 with a positive slope indicates the entry of the product 22 into the zone, the middle portion of the waveform S between times t2 and t3 with a substantially zero slope indicates the presence of the product 22 in the zone, and the trailing portion of the waveform S between times t3 and t4 with a negative slope indicates the exit of the product 22 from the zone. The controller 44 is operative for measuring the trailing portion of the waveform S to determine the exit time and the exit speed of the product. For example, if the trailing portion of the waveform S lasts less than one second, or preferably, less than 200 milliseconds, then this relatively quick exit time indicates that the product is being swiped through the workstation.

Figure 5:
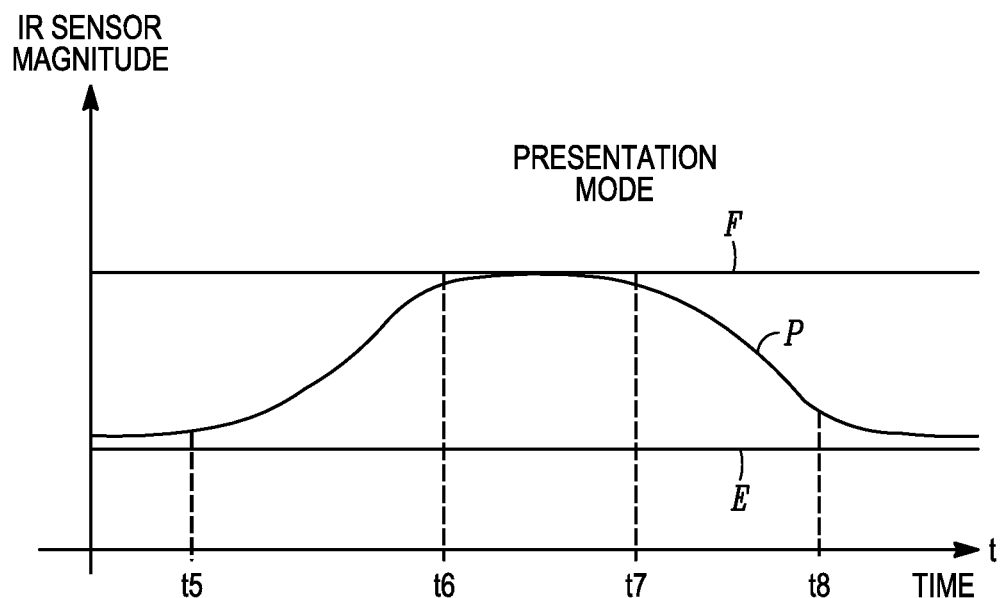
FIG. 5 is a graph of an analog signal waveform generated by the proximity system of FIG. 3 when a product is passed through the workstation in a presentation mode.

Analogously, in FIG. 5, the leading portion of the waveform P between times t5 and t6 with a positive slope indicates the entry of the product 22 into the zone, the middle portion of the waveform P between times t6 and t7 with a substantially zero slope indicates the presence of the product 22 in the zone, and the trailing portion of the waveform P between times t7 and t8 with a negative slope indicates the exit of the product 22 from the zone. The controller 44 is operative for measuring the trailing portion of the waveform P to determine the exit time and the exit speed of the product. For example, if the trailing portion of the waveform P lasts more than 500 milliseconds, or preferably, more than one second, then this relatively slower exit time indicates that the product is being presented at the workstation.

The controller not only measures the exit times to indicate whether the product is being swiped or presented, but also measures the extent of the slope of the trailing portions of the waveforms P, S. To reliably distinguish between successive products, the controller determines whether each change in magnitude over time of the return IR light of the product exiting the zone exceeds a predetermined threshold or reference slope for each mode. Thus, the measured slope must exceed a predetermined reference value before the controller confirms that a product has indeed exited the workstation. Slope measurement performed by the controller is well known to the skilled artisan.

It will be understood that each of the elements described above, or two or more together, also may find a useful application in other types of constructions differing from the types described above. For example, the workstation need not be the illustrated bi-optical workstation having dual presentation windows as described above, but could also be configured either as a stand-mounted scanner having a single presentation window, or as a vertical slot scanner having a single upright presentation window, or as a flat-bed or horizontal slot scanner having a single, generally horizontally arranged presentation window. The target need not be the illustrated one-dimensional symbol, but could also be a truncated symbol, a stacked symbol, or a two-dimensional symbol, as well as a non-symbol target, such as a driver's license, a receipt, a signature, etc. The workstation need not have the illustrated two imagers, but could have more or less than two imagers, and one or all of the imagers could be replaced by laser-based readers. The proximity system need not be light-based. Also, the IR emission axis and the IR detection axis need not cross over as illustrated, but could also be positioned in mutual parallelism and extend perpendicularly of the upright window.\

In accordance with another feature of this invention, a method of processing successive products associated with successive targets to be electro-optically read, is performed by supporting a window on a housing, reading the successive targets with return light passing through the window, detecting entry of each successive product associated with a respective successive target into a zone outside the window, detecting exit of each successive product associated with the respective successive target from the zone, processing the return light from the respective successive target in response to detection of the entry of each successive product into the zone, and distinguishing among the successive products in response to detection of the exit of each successive product from the zone.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for processing successive products associated with successive targets to be electro-optically read, comprising:
   a housing;
   a window supported by the housing;
   a reading system supported by the housing, and operative for reading the successive targets with return light passing through the window;
   a proximity system supported by the housing, and operative for detecting entry of each successive product associated with a respective successive target into a zone outside the window, and for detecting exit of each successive product associated with the respective successive target from the zone;
   a controller operatively connected to the reading system and the proximity system, and operative for processing the return light from the respective successive target in response to detection of the entry of each successive product into the zone, and for distinguishing among the successive products in response to detection of the exit of each successive product from the zone;
   wherein the proximity system includes an infrared (IR) emitter for emitting IR light into an IR emission field, and an IR sensor for sensing return IR light within an IR detection field; and wherein the IR sensor is operative for detecting the entry of each successive product into the zone, and the exit of each successive product from the zone by sensing a change in magnitude over time of the return IR light returned by each successive product; and
   wherein the controller is operative for determining whether each change in magnitude over time of the return IR light is indicative of one of a swipe mode in which a product is swiped across the window, and a presentation mode in which a product is presented and momentarily held at the window; and wherein the controller is operative for determining whether each change in magnitude over time of the return IR light of the product exiting the zone exceeds a predetermined threshold for each mode.

2. The apparatus of claim 1, wherein the reading system includes a solid-state imager having an array of image sensors looking at a field of view that extends through the window to each target to be imaged, and an energizable illumination system for illuminating the field of view with illumination light over an illumination field; and wherein the controller is operative for energizing the illumination system in response to the detection of the entry of each successive product into the zone, and for processing return illumination light returned from the respective successive target and captured in the field of view by the imager.

3. The apparatus of claim 1, wherein the housing supports the window in an upright plane, and wherein the housing supports an additional window in a generally horizontal plane that intersects the upright plane, and wherein the zone is outside both windows.

4. The apparatus of claim 1, wherein the IR emission field and the IR detection field intersect in the zone.

5. The apparatus of claim 1, wherein the housing supports the window in an upright plane, and wherein the housing supports an additional window in a generally horizontal plane that intersects the upright plane, wherein the IR emitter is operative for emitting the IR light along an inclined IR emission axis into the IR emission field above the generally horizontal window, and wherein the IR sensor is operative for sensing the return IR light along an inclined IR detection axis in the IR detection field above the generally horizontal window, and wherein the inclined axes intersect above the generally horizontal window.

6. A point-of-transaction workstation for processing successive products associated with successive targets to be electro-optically read, comprising:
a housing for supporting an upright window in an upright plane, and a generally horizontal window in a generally horizontal plane that intersects the upright plane, the windows bounding a volume through which the products pass through the workstation;
an imaging system supported by the housing, and operative for imaging the successive targets with return light passing through at least one of the windows;
a proximity system supported by the housing, and operative for detecting entry of each successive product associated with a respective successive target into a zone outside the windows, and for detecting exit of each successive product associated with the respective successive target from the zone, the proximity system including an infrared (IR) emitter for emitting IR light into an IR emission field, and an IR sensor for sensing return IR light within an IR detection field, the IR sensor being operative for detecting the entry of each successive product into the zone, and the exit of each successive product from the zone by sensing a change in magnitude over time of the return IR light returned by each successive product;
a controller operatively connected to the imaging system and the proximity system, and operative for processing the return light from the respective successive target in response to the detection of the entry of each successive product into the zone, and for distinguishing among the successive products in response to the detection of the exit of each successive product from the zone;
wherein the controller is operative for determining whether each change in magnitude over time of the return IR light is indicative of one of a swipe mode in which a product is swiped across a respective window, and a presentation mode in which a product is presented and momentarily held at a respective window; and
wherein the controller is operative for determining whether each change in magnitude over time of the return IR light of the product exiting the zone exceeds a predetermined threshold for each mode.

7. A method of processing successive products associated with successive targets to be electro-optically read, comprising:
supporting a window on a housing;
reading the successive targets with return light passing through the window;
detecting entry of each successive product associated with a respective successive target into a zone outside the window;
detecting exit of each successive product associated with the respective successive target from the zone,
processing the return light from the respective successive target in response to detection of the entry of each successive product into the zone; distinguishing among the successive products in response to detection of the exit of each successive product from the zone;
wherein the detecting of the entry and exit of each successive product is performed by emitting infrared (IR) light into an IR emission field, and by sensing a change in magnitude over time of return IR light returned by each successive product within an IR detection field;
determining whether each change in magnitude over time of the return IR light is indicative of one of a swipe mode in which a product is swiped across the window, and a presentation mode in which a product is presented and momentarily held at the window; and
determining whether each change in magnitude over time of the return IR light of the product exiting the zone exceeds a predetermined threshold for each mode.

8. The method of claim 7, wherein the reading is performed by a solid-state imager having an array of image sensors looking at a field of view that extends through the window to each target to be imaged, and by illuminating the field of view with illumination light over an illumination field in response to the detection of the entry of each successive product into the zone; and wherein the processing is performed by processing return illumination light returned from the respective successive target and captured in the field of view by the imager.

9. The method of claim 7, wherein the supporting is performed by supporting the window in an upright plane, and by supporting an additional window in a generally horizontal plane that intersects the upright plane, and wherein the detecting of the entry and the exit of each successive product is performed by locating the zone outside both windows.

10. The method of claim 7, and intersecting the IR emission field and the IR detection field in the zone.

11. The method of claim 7, wherein the supporting is performed by supporting the window in an upright plane, and by supporting an additional window in a generally horizontal plane that intersects the upright plane; wherein the detecting of the entry and exit of each successive product is performed by emitting infrared (IR) light into an IR emission field, and by sensing a change in magnitude over time of return IR light returned by each successive product within an IR detection field above the generally horizontal window.

* * * * *